United States Patent
Insanic et al.

(10) Patent No.: US 9,583,954 B2
(45) Date of Patent: Feb. 28, 2017

(54) SYSTEM AND METHOD FOR ELECTRICAL CHARGE TRANSFER ACROSS A CONDUCTIVE MEDIUM

(71) Applicant: RAYTHEON BBN TECHNOLOGIES CORP., Cambridge, MA (US)

(72) Inventors: Edin Insanic, Belmont, MA (US); Joshua Michael Cochin, Waltham, MA (US); Benjamin Phillip Bromberg, Cambridge, MA (US); Will E. Leland, Berkeley Heights, NJ (US)

(73) Assignee: RAYTHEON BBN TECHNOLOGIES CORP., Cambridge, MA (US)

( * ) Notice: Subject to any disclaimer, the term of this patent is extended or adjusted under 35 U.S.C. 154(b) by 120 days.

(21) Appl. No.: 14/535,728

(22) Filed: Nov. 7, 2014

(65) Prior Publication Data
US 2015/0130405 A1    May 14, 2015

Related U.S. Application Data

(60) Provisional application No. 61/902,126, filed on Nov. 8, 2013.

(51) Int. Cl.
*H02J 7/00*      (2006.01)
*H02J 7/02*      (2016.01)
*H02J 17/00*     (2006.01)

(52) U.S. Cl.
CPC ............ *H02J 7/0042* (2013.01); *H02J 7/025* (2013.01); *H02J 17/00* (2013.01); *Y10T 307/406* (2015.04)

(58) Field of Classification Search
CPC .. A61N 2001/083; H02J 17/00; H02J 7/0042; H02J 7/025
See application file for complete search history.

(56) References Cited

U.S. PATENT DOCUMENTS

| | | | |
|---|---|---|---|
| 4,212,053 | A | 7/1980 | Sichenzia |
| 6,547,351 | B1 | 4/2003 | Wilson |

(Continued)

FOREIGN PATENT DOCUMENTS

| | | |
|---|---|---|
| WO | WO 2012/086973 A2 | 6/2012 |
| WO | WO 2013/018084 A1 | 2/2013 |

OTHER PUBLICATIONS

Burkhart, Justin M. et al.; "Design Methodology for a Very High Frequency Resonant Boost Converter"; IEEE Transactions on Power Electronics; vol. 28; No. 4; Apr. 2013; pp. 1929-1937.

(Continued)

*Primary Examiner* — Vuthe Siek
(74) *Attorney, Agent, or Firm* — Lewis Roca Rothgerber Christie LLP (57) ABSTRACT

A method for supplying power to detected devices coupled to a conductive backplane includes: supplying a plurality of sensing signals at a plurality of transmit impedance values to the conductive backplane; analyzing a plurality of return signals received from the conductive backplane, the return signals corresponding to the sensing signals; detecting the presence of a sink device coupled to the conductive backplane based on the analyzed return signals; and supplying power from a power supply to the sink device via the conductive backplane after detecting the presence of the sink device.

19 Claims, 10 Drawing Sheets

(56) References Cited

U.S. PATENT DOCUMENTS

| | | |
|---|---|---|
| 2008/0026354 A1 | 1/2008 | Marmaropoulos et al. |
| 2009/0218884 A1 | 9/2009 | Soar |
| 2009/0267588 A1 | 10/2009 | Schmitz et al. |
| 2010/0100997 A1 | 4/2010 | Lee et al. |
| 2010/0114204 A1* | 5/2010 | Burnes ............... A61N 1/36146 607/4 |
| 2011/0235800 A1 | 9/2011 | Furukawa et al. |
| 2013/0005251 A1 | 1/2013 | Soar |
| 2013/0033118 A1 | 2/2013 | Karalis et al. |

OTHER PUBLICATIONS

Elliot, P.G. et al.; "E-textile Microstrip Patch Antennas for GPS"; IEEE; 2012; pp. 66-73.

Elmore, Glenn; "Introduction to the Propagating Wave on a Single Conductor"; Corridor Systems Inc.; Jul. 27, 2009; 30pp.

Goubau, Georg; "Surface Waves and Their Application to Transmission Lines"; J. App. Phys., vol. 21; Nov. 1950; pp. 1119-1128.

Haga, Nozomi et al.; "Equivalent Circuit of Intrabody Communication Channels Inducing Conduction Currents Inside the Human Body"; IEEE Transactions on Antennas and Propagation; vol. 61; No. 5; May 2013; pp. 2807-2816.

Zimmerman, T.G.; "Personal Area Networks: Near-Field intrabody communication"; IBM Systems Journal; vol. 35; Nos. 3&4; 1996; pp. 609-617.

Written Opinion of the International Searching Authority for International Application No. PCT/US2014/064560, filed Nov. 7, 2014, Written Opinion of the International Searching Authority mailed Jul. 21, 2015 (7 pgs.).

International Search Report for International Application No. PCT/US2014/064560, filed Nov. 7, 2014, International Search Report dated Jul. 10, 2015 and mailed Jul. 21, 2015 (4 pgs.).

\* cited by examiner

SYSTEM AND METHOD FOR ELECTRICAL CHARGE TRANSFER ACROSS A CONDUCTIVE MEDIUM

CROSS-REFERENCE TO RELATED APPLICATION(S)

This application claims the benefit of U.S. Provisional Patent Application No. 61/902,126, filed in the United States Patent and Trademark Office on Nov. 8, 2013, the entire disclosure of which is incorporated herein by reference.

FIELD

Embodiments of the present invention relate to the field of systems and methods for delivering power and for transmitting information between multiple devices.

BACKGROUND

Modern soldiers and other professionals carry and utilize many portable electronic devices to perform their duties, ranging from communications equipment, vision aids (e.g., night vision goggles and binoculars), sensors, and navigation devices. Use of such portable electronic devices is only expected to grow. These devices generally utilize dedicated or device-specific batteries and generally intercommunicate using interconnecting cables, thereby adding weight and operational complexity to already-overloaded dismounts (e.g., the equipment a soldier carries when not on connected to supporting infrastructure such as a vehicle). For example, a standard dismount for a 72 hour mission often requires 70 batteries of 7 different types amounting to 16 pounds of additional weight.

As discussed above, modern professionals working in the field (e.g., soldiers and firefighters), often carry an array of electronic devices when performing their duties. These devices may include communication devices (e.g., phones and radios), navigation devices (e.g., GPS devices), lights (e.g., flashlights), vision aids (e.g., binoculars and night vision goggles), and other specialized tools. These electronic devices may have different power requirements (e.g., different operating voltages, wattages, and impedances) and therefore each generally includes a dedicated battery designed to meet the particular energy requirements of the device.

However, batteries generally require frequent charging or replacement, resulting in additional burden on logistics and training. For example, replacement and backup batteries need to be carried or stocked to replace drained units and a large number of charging systems need to be provided to recharge the dedicated batteries. In addition, the wide range of mutually incompatible types of batteries further increases logistical burden.

The electronic devices typically communicate with one another using interconnected cables. However, cables can interfere with movement, interconnects (e.g., the connectors or connection points between cables or between cables and devices) can degrade reliability, and device swaps can be time consuming and inconvenient. Fixed cable lengths and device placements are not scalable for various soldier sizes and may be incompatible with the movement habits of those soldiers.

Recent efforts in smart textiles, in which conducting wires are woven into clothing, only address cabling and power distribution. However, smart textiles provide only a partial solution because the textiles impose fixed locations on electronic devices. Furthermore, these textiles have inherent reliability issues due to the fragile interconnect wiring. Wireless solutions cannot distribute significant power to devices, have low signal transfer efficiencies, and, in many instances simply will not work in the field. Better batteries reduce weight but leave the user managing the batteries for each individual device.

Existing R&D efforts view these problems as independent, and have pursued piecemeal incremental improvements. One example of this is the Modular Universal Battery Charger (MUBC) (Thales, 2012)), which is able to use a variety of power sources, including car batteries and solar panels provides configurability and intelligence in charging. However, the Thales MUBC still requires separate charging of each device and still leaves a soldier tied in complex cabling and subject to operational disruptions to his mission.

SUMMARY

Embodiments of the present invention relate to a system including two or more devices that can communicate and exchange electrical energy across a shared conductive medium and a method of operating such a system. This medium can be a metal plate, a conductive textile, or any other electrically conductive material including wires and cables. Embodiments of the present invention do not require separate cables and interconnects, so the connections can made merely through contact between the devices and the shared conductive medium.

According to one embodiment, the conductive medium is exposed to environment (e.g., without electrical insulation) to create an opportunity for contact with devices. Embodiments of the present invention provide a controller to control the transmission of electrical charge between devices to ensure safe and efficient operation, whether the transmitted electrical charge conveys a communications signal or electrical power. Embodiments of the present invention also provide systems and methods for automated background system recharging and unattended connection management while monitoring operational conditions to ensure efficient and safe transfers.

Aspects of embodiments of the present invention behave roughly analogously to a wireless network access point (e.g., WiFi). Embodiments of the present invention utilize non-radiative operations and therefore produce limited emissions, ensuring RF signal concealment and security. Some embodiments of the present invention monitor the state of the inter-device connection to ensure maximum efficiencies and, hence, optimal impedance matches and low emissions, thereby reducing or minimizing EM signatures. Embodiments of the present invention also provide sensitive state monitoring and agile circuitry to prevent accidental discharge in extreme conditions such as water immersion, high temperatures, or mechanical impact.

Embodiments of the present invention relate to the body networks, consumer electronics and point-of-sale terminals. For example, embodiments of the present invention may be used in the defense industry with "smart" uniforms (or garments) and electronic chip manufacturers and may be used in the consumer electronics industry with applications in point-of-sale terminals, entry control (e.g., contact-based communication with security devices to permit entry or access to, for example, restricted areas, vehicles, equipment, or information), etc.

In some embodiments of the present invention, the conductive medium is intrinsically conductive (e.g., metal), and in other embodiments the conductive medium is a material plated with a conductive material. Some examples of such materials are: metal plates, conductive textiles, wire mesh, single wire cable, conductive paint, metal holders, metal enclosures, etc.

In some embodiments of the present invention, the conductive medium is a mesh or a network of conductive materials that can be completely exposed or partially or fully insulated. Some examples of such materials are: metal patches, conductive textiles, conductive textile patches, wire mesh, cable mesh, conductive paint, metal holders, metal enclosures, etc.

Embodiments of the present invention include configurable circuitry that natively supports high frequencies and large bandwidth, thereby enabling information (or data) exchange applications in addition to power management. For example, embodiments of the present invention can be used to provide communications capabilities for data exchange, secure communications, entry control, and biometric verification. Embodiments of the present invention also allow remote device interrogation and low-power provisioning, enabling cordless and battery-less distributed sensor networks to be integrated across a garment (e.g., a uniform). For example, health-monitoring devices on a wounded soldier could be accessed by a combat medic wearing a system according to embodiments of the present invention, even if the soldier's vest (including the soldier's primary battery) were removed, because the medic's battery could be used to power, control, and communicate with the soldier's health-monitoring devices.

Embodiments of the present invention continually monitor movement and external contacts to manage power distribution across the conductive medium. Embodiments of the present invention utilize the collected information to anticipate connections so that when the conductive medium comes in contact with a charging station, the connection is quickly and automatically detected and unsupervised charging can take place. This enables incorporation of charging stations at places frequented by dismounts, such as vehicle seats, seatbelts, sleeping bags, clothes hooks and clothes hangers, and simplifying charging management or equipment. Equipment that is not directly attached to a garment according to embodiments of the present invention can be placed in conductive pockets or retrofitted with conductive hook and loop material (e.g., Velcro®) to allow connection to the conductive textile backplane 10.

Therefore, embodiments of the present invention provide a wide variety of benefits, including, but not limited to: cable-free efficient inter-device communication and energy exchange; elimination or reducing of interconnect improves reliability and reduces training time; arbitrary and hassle-free placement of devices (e.g., placement at arbitrary locations on a worn garment); enhanced freedom of movement for the person wearing the garment (e.g., a soldier); centralized battery system with prioritized energy distribution; seamless exchange of charge and information among multiple systems (e.g., soldier-to-soldier and soldier-to-vehicle); battery-agnostic charging across garment (e.g., the soldier's uniform); unobtrusive automated charging system transfers energy opportunistically to match the efficiencies of wired system; significant battery weight reduction for the same amount of effective energy capacity (e.g., 30% reduction); 10 times reduction in logistics effort; and native support for passive sensors to enable seamless health monitoring.

In addition to reducing the burden on the user (e.g., a soldier), embodiments of the present invention improve supply logistics as well.

At the device level, circuitry according to embodiments of the present invention plays the role of a universal charger that can provide various power capacities and almost completely eliminate the need for individual devices to have disposable batteries. Furthermore, the battery-agnostic character of embodiments of the present invention makes it capable of natively supporting renewable energy generation, such as solar, kinematic, or RF harvesting.

According to one embodiment of the present invention, an apparatus for supplying power to a plurality of devices coupled to a conductive backplane, the conductive backplane including a conductive pathway, includes: sensing circuitry including a signal generator and a signal detector, the sensing circuitry coupled to the conductive backplane; a power supply coupled to the conductive backplane; and a controller circuit configured to: control the signal generator to supply a plurality of sensing signals at a plurality of transmit impedance values to the conductive backplane; analyze a plurality of return signals detected by the signal detector, the return signals corresponding to the sensing signals; detect, based on the analyzed return signals, the presence of a sink device coupled to the conductive pathway of the conductive backplane; and supply power from the power supply to the sink device via the conductive pathway after detecting the presence of the sink device.

The controller circuit may be further configured to: detect the absence of the sink device; and stop the supply of power from the power supply to the sink device via the conductive pathway in response to detecting the absence of the sink device.

The controller circuit may be configured to detect the absence of the sink device by detecting a change in a return signal of the return signals corresponding to the sink device.

The controller circuit may be configured to detect the absence of the sink device by detecting a decrease in current on the conductive pathway.

The controller circuit may be configured to: detect a short circuit on the conductive pathway; and stop supplying power from the power supply to the conductive pathway in response to detecting the short circuit.

The controller circuit may be further configured to: supply a handshake request to the sink device via the conductive pathway; and receive a handshake response from the sink device via the conductive pathway.

The controller circuit may be a central processing unit (CPU), a microcontroller, a field programmable gate array (FPGA), an application specific integrated circuit (ASIC), or an analog feedback circuit.

The handshake request may include a digital signal, the digital signal representing a code.

The handshake response may include a change in impedance, and the apparatus may be configured to receive the handshake response by detecting a change in a return signal of the return signals after supplying the handshake request.

The conductive pathway may include a conductive fabric of an article of clothing.

The apparatus may be configured to charge a battery coupled to the apparatus via the conductive pathway.

The apparatus may be located on a vehicle including a seat, wherein the conductive pathway may include a first electrically conductive portion of a surface of the seat, wherein the apparatus may be configured to change the battery while the battery is electrically connected to a second electrically conductive portion of an article of clothing, and wherein the first electrically conductive portion of the surface of the seat may be electrically connected to the second electrically conductive portion of the article of clothing.

According to another embodiment of the present invention, an apparatus configured to receive power via a shared conductive backplane, includes: a terminal coupled to the shared conductive backplane; and a first device identification impedance electrically connected to the terminal and the shared conductive backplane.

The apparatus may further include: a second device identification impedance; and a switch configured to selectively couple and decouple the second device identification impedance to the shared conductive backplane.

The apparatus may further include a controller circuit, wherein the controller circuit is configured to: detect a handshake request signal via the conductive backplane; and turn the switch on or off in response to the detected handshake request.

According to another embodiment of the present invention, a method for supplying power to detected devices coupled to a conductive backplane includes: supplying a plurality of sensing signals at a plurality of transmit impedance values to the conductive backplane; analyzing a plurality of return signals received from the conductive backplane, the return signals corresponding to the sensing signals; detecting the presence of a sink device coupled to the conductive backplane based on the analyzed return signals; and supplying power from a power supply to the sink device via the conductive backplane after detecting the presence of the sink device.

The method may further include: detecting the absence of the sink device; and stopping the supplying power to the sink device via the conductive backplane in response to detecting the absence of the sink device.

The detecting the absence of the sink device may include detecting a change in a return signal of the return signals corresponding to the sink device.

The detecting the absence of the sink device may include detecting a decrease in current on the conductive pathway.

The method may further include: detecting a short circuit; and stopping the supplying power to the sink device via the conductive backplane in response to detecting the short circuit.

The method may further include: supplying a handshake request to the sink device via the conductive pathway; and receiving a handshake response from the sink device via the conductive pathway.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Embodiments of the present invention utilize a shared conductive medium to create an energy and information distribution medium (or conductive medium or network) which allows the textile bus to act as an intelligent conformal "docking station." Embodiments of the present invention include a fast, networked impedance control system operating in a closed feedback loop, where the control system continuously monitors efficiency and energy transfers that are performed in an opportunistic fashion to compensate for the continuous and unpredictable changes in operational parameters due to body movement and variations in operational environment. In some embodiments, monitoring and energy transfers may be performed by an analog feedback circuit.

To achieve conductivity, according to one embodiment a conductive medium 10 (e.g., a user's garment such as a soldier's uniform) 10 can either be woven from conductive thread or plated with conductive polymers. According to one embodiment of the present invention, conductive textiles available from Shieldex-U.S. Inc. are used to provide the conductive thread or material used in the soldier's uniform.

A device configured to operate with the system according to embodiments of the present invention can becomes a part of the system merely through physical contact with the conductive medium. As such, electrical charge can be transferred to and from the device from other devices that are in contact with the conductive medium. These devices can include manager devices, primary power source devices, power sink devices, satellite devices, external charging ports, and other networks (e.g., other conductive mediums).

Figure 1A:
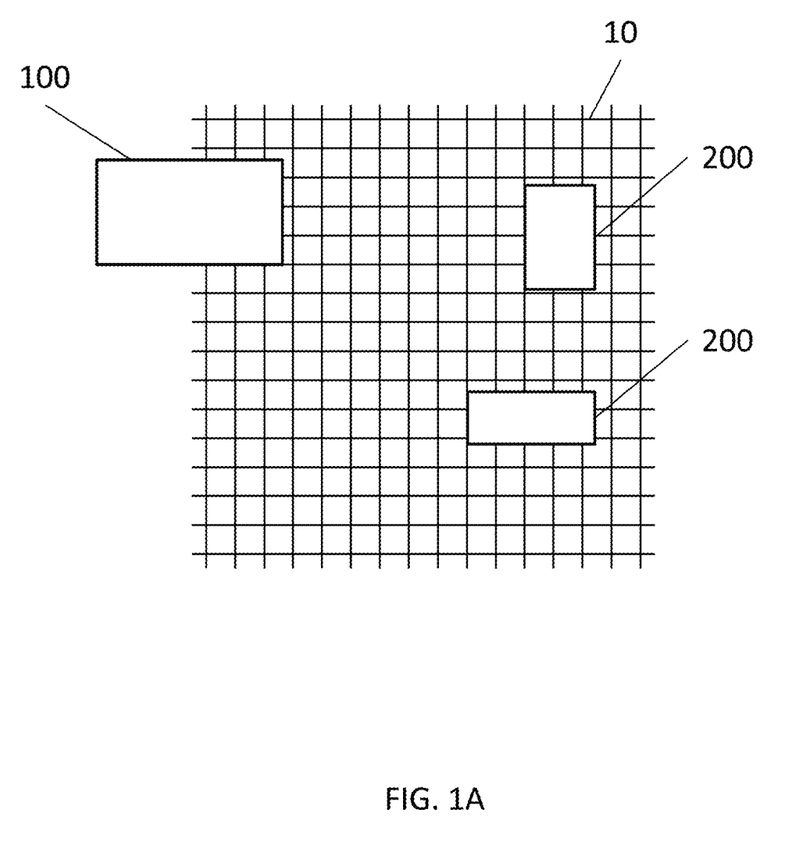
FIG. 1A is a block diagram illustrating a system using a shared conductive medium according to one embodiment of the present invention.

FIG. 1A is a block diagram illustrating a power management system using a shared conductive medium according to one embodiment of the present invention, where the system includes a conductive medium 10, a manager device 100, and active and passive sink devices 200. The manager device 100 and the active and passive sink devices 200 are all electrically connected to the conductive medium 10 using, for example, electrically conductive terminals (or electrodes) on surfaces of the devices contacting the conductive medium 10. As such, the manager device 100 and the active and passive sink devices 200 are all electrically connected with one another through the conductive medium 10

Figure 1B:
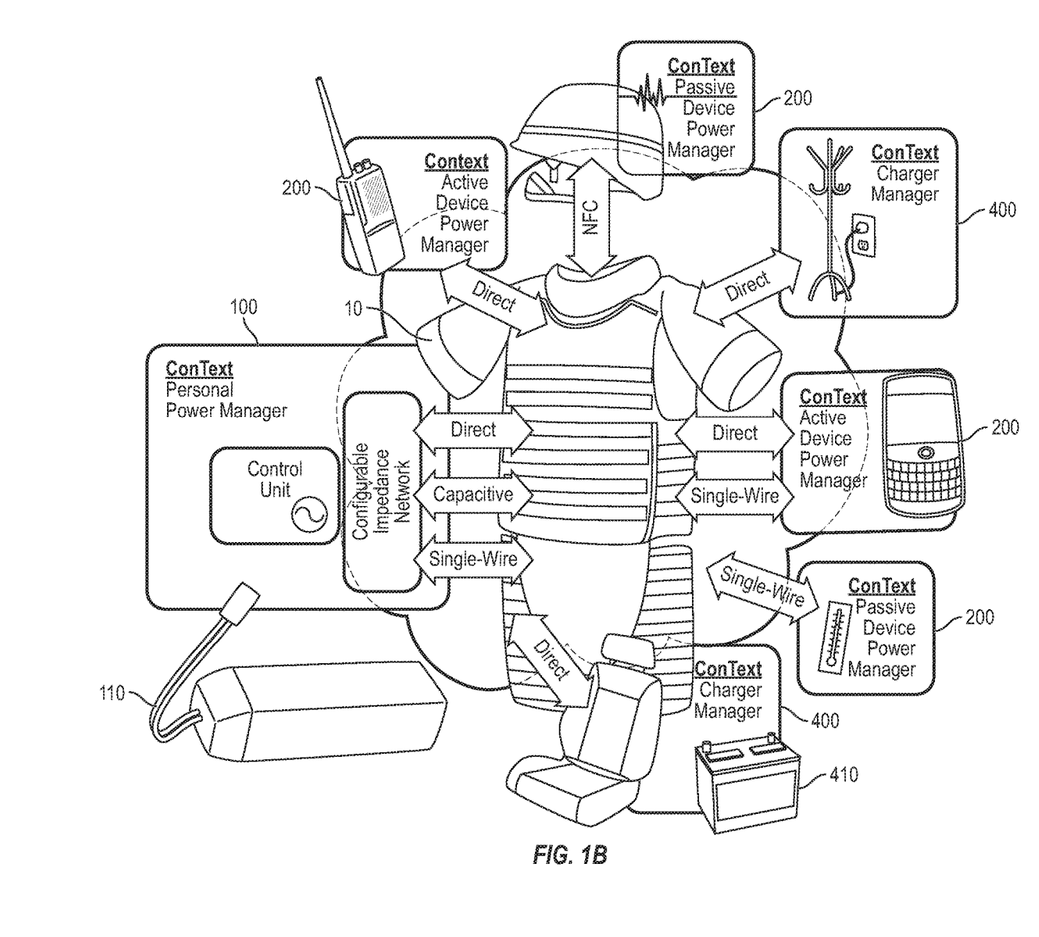
FIG. 1B is a schematic diagram illustrating various devices connected to a system according to one embodiment of the present invention.

FIG. 1B is a schematic diagram illustrating various devices connected to a system according to one embodiment of the present invention in which a manager device is coupled to a soldier's uniform along with various other devices such as power sources, power consuming devices, and connections to external power sources. As shown in FIG. 1B, the manager device 100 may be coupled to a battery 110 so that the manager device 100 can supply power to the active and passive sink devices 200. In addition, FIG. 1B illustrates charger managers 400 that can also be connected to the conductive medium 10 through, for example, vehicle seats and coat racks. The charger manager 400 can also be connected to a battery 410 or may include a connection to a power grid.

Figure 1C:
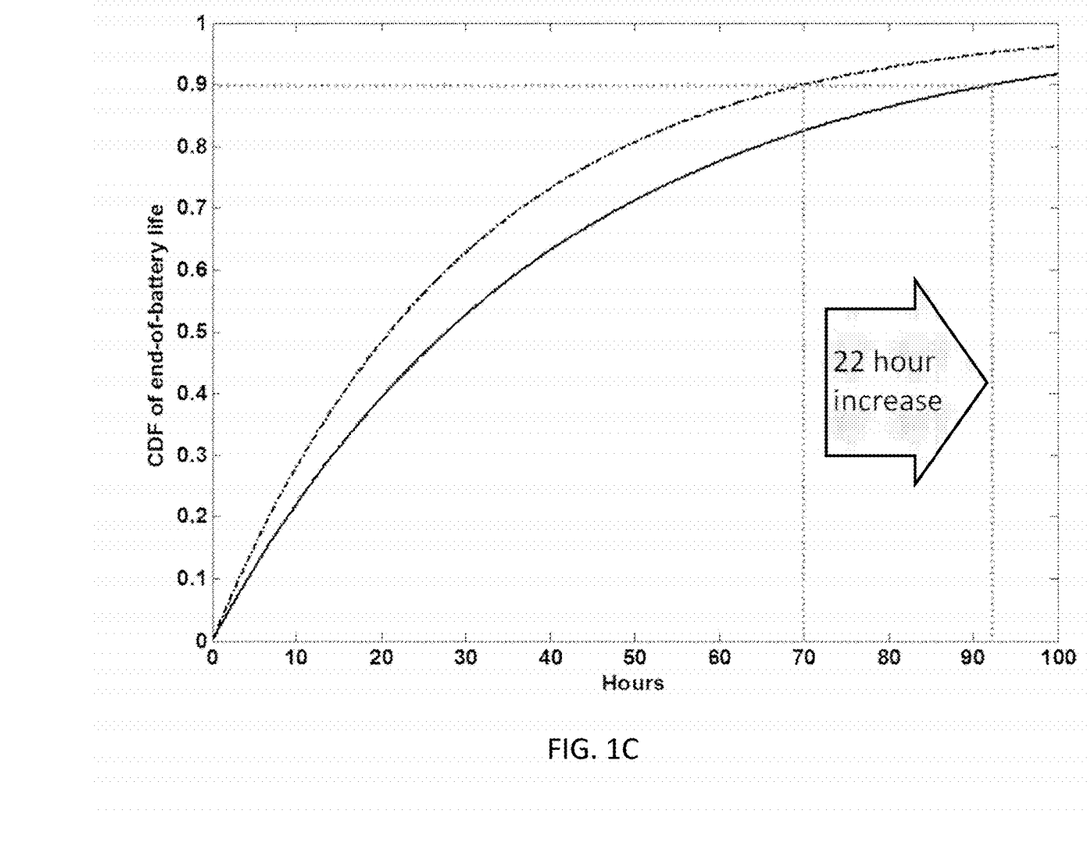
FIG. 1C is a graph comparing the cumulative distribution functions corresponding to the estimated operational lifetimes of a shared battery configuration and a conventional battery configuration with separate batteries for each device.

Aspects of embodiments of the present invention allow distributed battery systems to be cable-free, adaptable, and reliable while providing ready access to information and dynamic control over configuration. This results in improved load balance, which in turn reduced the burden on battery capacities. FIG. 1C is a graph comparing the cumulative distribution functions corresponding to the estimated operational lifetimes of a shared battery configuration and a conventional battery configuration with separate batteries for each device, where the shared battery system (solid line) has an estimated 22-hour longer operational life than the equivalent system made of individual batteries for the same total capacity (dashed line). This difference translates to a 30% lower battery capacity requirement, and hence 30% lower weight for similar performance.

However, centralized power systems are vulnerable to single-point failures. Embodiments of the present invention inherently manage redundant centralized batteries, thereby increasing reliability while providing the benefit of a shared energy source without cumbersome interconnect.

Embodiments of the present invention include three aspects: a common signal backplane (or conductive backplane) 10, components of a manager module 100 and one or more sink devices that provide intelligent distribution of power and data, and interconnecting hardware. The sink devices may include active and passive sink devices 200.

Figure 2:
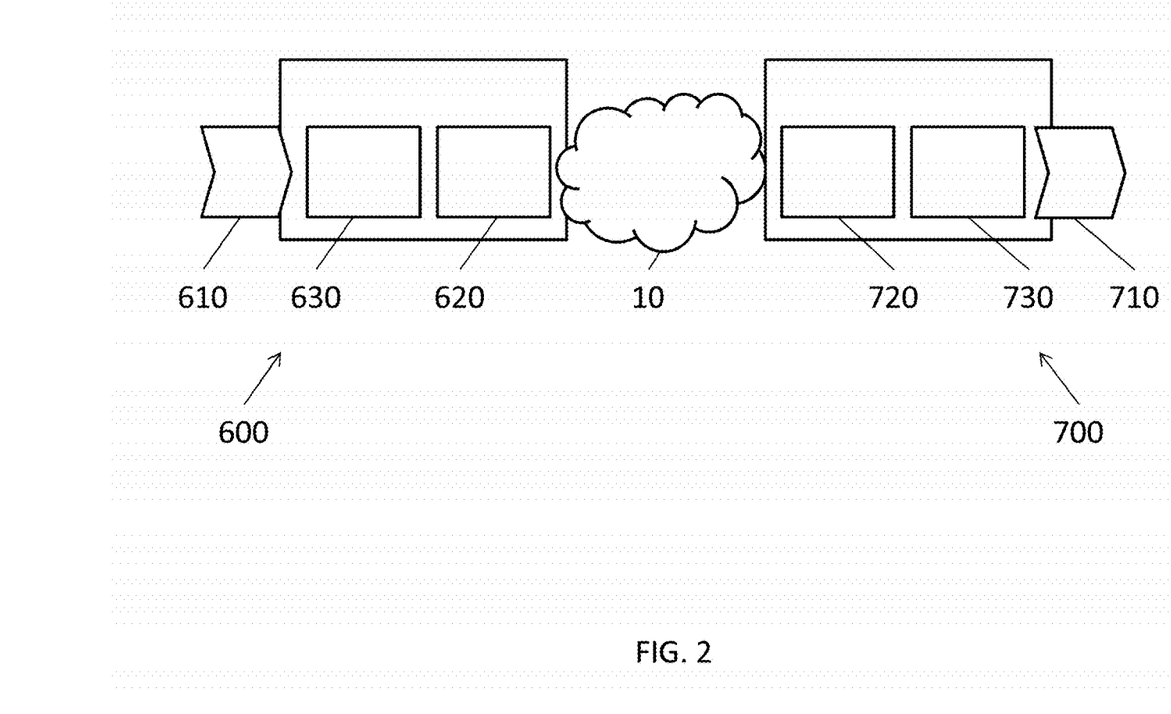
FIG. 2 is a schematic diagram illustrating an underlying concept of power and data transmission between devices in accordance with embodiment of the present invention.

FIG. 2 is a schematic diagram illustrating an underlying concept of power and data transmission between devices in accordance with embodiment of the present invention. As shown in FIG. 2, the conductive backplane 10 serves as a transmission modality between from a supply 610 to a sink 710. The transmitting (source) side 600 and receiving (sink) side 700 both include an interface 620 and 720 directly connected to the conductive backplane 10 and a controller circuit 630 and 730 configured to control their respective interfaces 620 and 720 to measure the impedances of the interfaces NN conditions and to adjust the operational parameters (e.g., voltage, frequency, and phase) according to conditions. The controller circuit may be a central processing unit (CPU), a microcontroller, a field programmable gate array (FPGA), an application specific integrated circuit (ASIC), or an analog feedback circuit.

According to one embodiment, the conductive backplane 10 includes an exposed electrical conduit including of one or more electrically conductive paths that are electrically disjoint from Earth ground and from each other. For example, one shared conductive medium may correspond to a conductive jacket while another, electrically separate conductive medium may correspond to conductive pants. In various embodiments of the present invention, the exposed electrical conduit can be any electrically conductive material, such as conductive textile, enclosures, cables, railing, etc. This component may be referred to herein as a conductive medium or a transmission medium or modality.

According to some embodiments of the present invention, conductive textiles used as the common signaling backplane 10. Conductive textile applications range from consumer electronics and medical antimicrobial treatment (Raoul Groβ, 2010) to thermal imaging evasion and conformal antennas (Elliot, Rama Rao, Davis, & Marcus, 2012). Conductive textiles have wear performance and feel similar to typical non-conductive fabrics and can be made from various source materials, including polymers (Liangbing Hu, 2010).

To perform impedance measurement concurrently (or simultaneously) with supplying power (DC or AC) to subordinate class of devices (e.g., sink devices), embodiments of the present invention utilize frequency or time division multiplexing between the measurement and energy transfer. For example, while power is being transferred using DC, impedance measurements can take place at an AC frequency (e.g., a high frequency). As another example, AC power may be supplied at a different time than other AC signals.

Figure 3A:
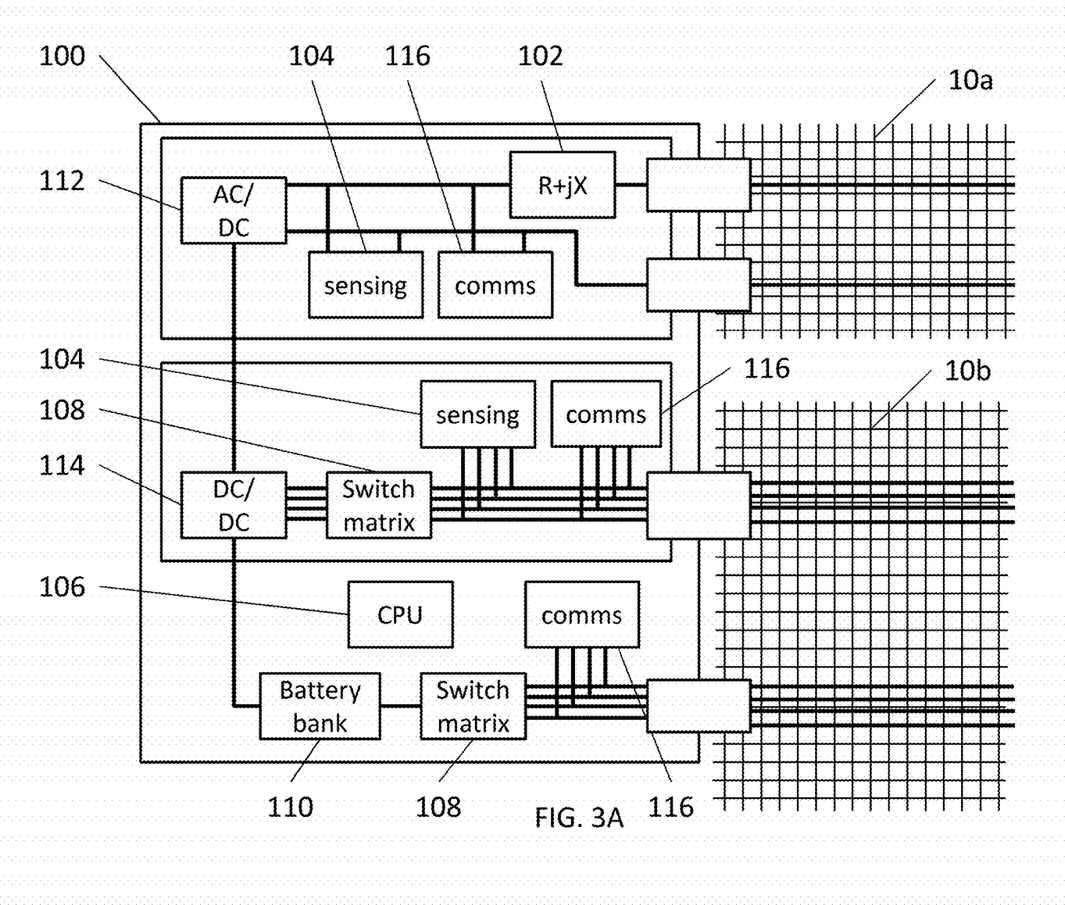
FIG. 3A is a schematic diagram of a manager device according to one embodiment of the present invention.

FIG. 3A is a schematic diagram of a manager device 100 according to one embodiment of the present invention. As shown in FIG. 3A, the manager device 100 may be electrically connected to more than one conductive medium 10a and 10b, which may be electrically disconnected from one another and which may each be coupled to one or more sink devices. For example, in one embodiment the conductive medium 10a corresponds to the vest of a soldier's uniform while conductive medium 10b corresponds to the pair of pants. Furthermore, in some embodiment of the present invention, the conductive medium 10 may be a multipath backplane in that it includes a plurality of electrically insulated conductive media. For example, an electrically conductive vest with a multipath backplane may include multiple layers of conductive fabric or multiple strips of conductive fabric, where each of these layers or strips are electrically insulated from one another.

In addition, embodiments of the present invention are not limited to circumstances in which the conductive medium is integrated into articles of clothing. In some embodiments of the present invention, the conductive medium is a mesh or a network of conductive materials that can be completely exposed or partially or fully insulated. Some examples of such materials are: metal patches, conductive textiles, conductive textile patches, wire mesh, cable mesh, conductive paint, metal holders, metal enclosures, etc.

The manager device 100 is one or more of a first tier of systems that include: sensing circuitry 104 that that can generate complex electrical signals (complex meaning a signals varying in amplitude and phase), supply the generated signals to the conductive medium 10, and measure the returns of the complex signals; processing (intelligence) circuitry 106 (e.g., a controller circuit such as an application specific integrated circuit, a field programmable gate array, a microcontroller, or a microprocessor with memory for storing data and program instructions), electronic switching circuitry 108 that can switch across multiple terminals/ connections that are connected to the various electrically insulated portions of the conductive medium (e.g., different layers or strips of conductive fabric) as described above; and impedance switching circuitry 102 that can create various complex impedances (e.g., various resistances with various inductances and capacitances). The manager may also include AC/DC 112 or DC/DC 114 conversion circuitry and routing circuitry. Furthermore, the manager may include communication (or "comms") circuitry 116 to generate and receive signals for digital communication between devices coupled to the backplane 10 (e.g., sink devices and other manager devices).

Example constituent circuitry of the electronic circuitry for creating various complex impedances include variable delay lines, varactor diodes, and tunable dielectric materials. In addition, signal generation circuitry 112 can adjust the amplitude, frequency, and phase of the AC source signals to reduce or minimize transfer losses.

Figure 3B:
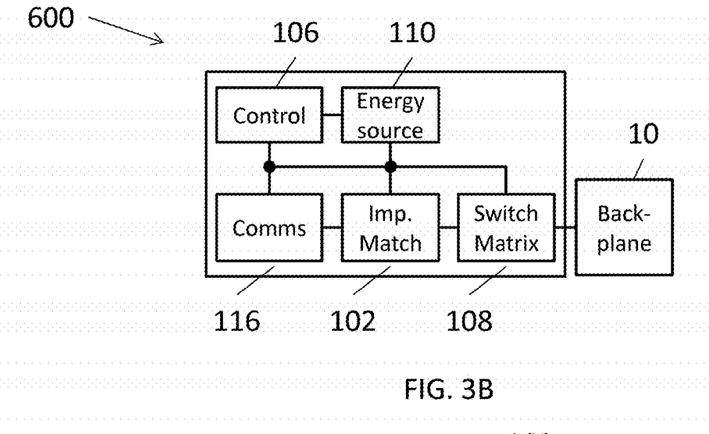
FIG. 3B is a block diagram illustrating a transmit side of a system according to one embodiment of the present invention

FIG. 3B is a block diagram illustrating a transmit side 600 of a system according to one embodiment of the present invention in which various components of the transmit side 600 correspond to components of the manager device 100.

Figure 3C:
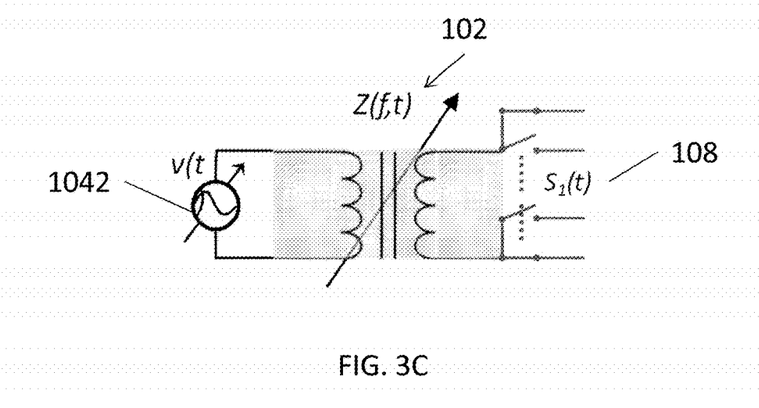
FIG. 3C is a circuit diagram illustrating a transmit side circuit according to one embodiment of the present invention.

FIG. 3C is a schematic representation of a transmit side circuit 600 according to one embodiment of the present invention. An AC voltage source 1042 (which, in one embodiment, is a component of the sensing circuitry 104) generates signals that are adjusted in phase and amplitude to increase or maximize transfer efficiencies. A switching network 108 is used to select an optimal charge transfer path in the instance of multipath backplane. The sensing circuitry 104 measures reflections of the generated signals and the processing circuitry 106 uses the measured signals to evaluate transmission medium conditions as will be described in more detail below. According to one embodiment of the present invention, the processing circuitry 106 is configured to make some assumptions about the character of reflected signals (e.g., expected characteristic impedance and expected delay across the backplane), so to establish initial set of conditions. In some embodiments, an impedance transformer is used as the impedance matching circuitry 102 between the backplane 10 and the transmit side 600, but embodiments of the present invention are not limited thereto and any impedance matching network, such as one constructed with inductors, capacitors, delay lines and other circuit elopements can be used.

Figure 3D:
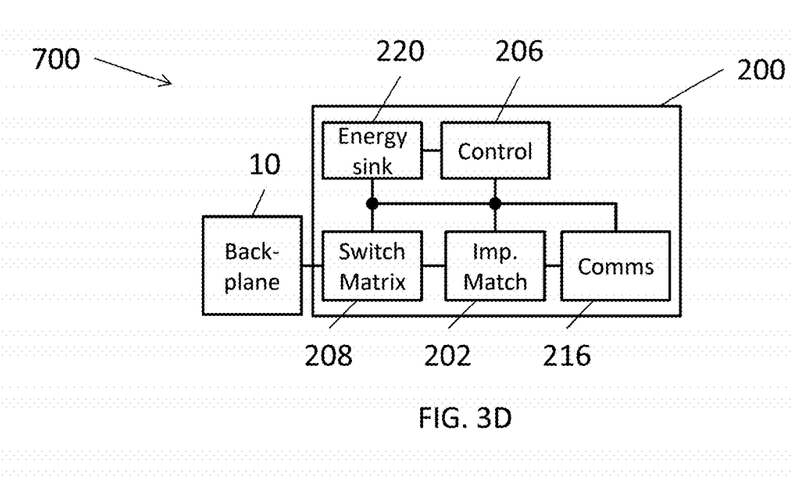
FIG. 3D is a schematic block diagram of a receive side of a sink device in accordance with one embodiment of the present invention.

According to one embodiment of the present invention, the system includes two classes of sink devices: active sinks and passive sinks. FIG. 3D is a schematic block diagram of a receive side 700 of a sink device 200 in accordance with one embodiment of the present invention. The sink device 200 shown in FIG. 3D includes an energy sink 220, representing the load of the device to be powered (e.g., a wireless communication device, an environmental or health sensor, a navigation device, etc.); processing (intelligence) circuitry 206 (e.g., a controller circuit such as an application specific integrated circuit, a field programmable gate array, a microcontroller, or a microprocessor and memory for storing data and program instructions), electronic switching circuitry 208 that can switch across multiple terminals/connections that are connected to the multipath backplane described above, impedance matching electronic circuitry 202 that can create various complex impedances (e.g., various resistances with various inductances and capacitances) to improve transfer efficiencies. In some embodiments, an impedance transformer is used as the impedance matching circuitry 202 between the backplane 10 and the device 700, but embodiments of the present invention are not limited thereto and any impedance matching network, such as one constructed with inductors, capacitors, delay lines and other circuit elopements can be used. The sink device 200 may further include communications circuitry (or "comms") 216 to generate and receive signals for digital communication between devices coupled to the backplane 10 (e.g., manager devices).

According to some embodiments of the present invention, sink devices are identified by the complex impedance (real and/or imaginary) of the device along with the physical position of a device on the backplane, which together define a unique device ID. For further differentiation, in some embodiments the device ID can be configured as a set of impedances that are iteratively switched with respect to level of interrogating (sensing) voltage.

Figure 3E:
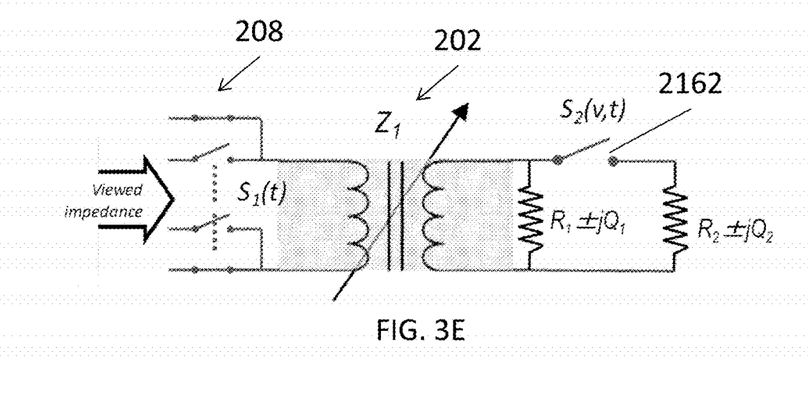
FIG. 3E is a circuit diagram illustrating a sink device according to one embodiment of the present invention.

FIG. 3E is a circuit diagram illustrating a sink device 700 according to one embodiment of the present invention configured to provide iteratively (or sequentially) changing impedance. Here, the communications circuitry 216 includes first and second impedances $R_1 \pm jQ_1$ and $R_2 \pm jQ_2$ and an additional switch 2162 controlled by signal $s_2(v,t)$ to selectively connect and disconnect second stage impedance $R_2 \pm jQ_2$ to provide a reference transition for timing purposes and "increased-complexity" in the impedance-based device ID. Although FIG. 3E illustrates an embodiment with two impedances $R_1 \pm jQ_1$ and $R_2 \pm jQ_2$ and one switch 2162, embodiments of the present invention are not limited thereto and may include more than two impedances and more than one switch 2162 to provide additional impedances to present to sensing circuitry to provide additional information in a device ID, as will be discussed in more detail below.

In some embodiments, the sink device is an active sink device that includes a local power source such as a battery. In such embodiments, the sink device may be configured to operate without being powered by an external source via the conductive backplane. In some embodiments, the battery of the active sink device can be charged via the backplane. Because an active sink device includes a local power source, it can perform operations (e.g., performing computations on a controller circuit, transmitting signals, etc.) using the local power.

In some embodiments, the sink device is a passive sink device that does not include local power and that uses energy provided from the transmit side to function. Passive sink devices may behave in a manner similar to passive RFID tags, in which sensing signals received by the passive sink device can cause the passive sink device to send information back to the manager. In some instances, the passive sink is powered by the received sensing signal. For example, the passive sink device may include conversion circuitry including a rectifier and a capacitor for converting and storing AC power received from the backplane 10.

According to some embodiments of the present invention, charger devices 400 include a transmit side structure substantially identical to the transmit side 600 illustrated in FIG. 3B, the description of which will not be repeated herein.

A manager device 100 or a charger device 400 coupled to a backplane 10 acts as a "master" of the backplane and it coordinates communications with "subordinate" devices (e.g., active and passive sink devices). If two or more manager devices are attached to a backplane (e.g. two different backplanes come into contact, such as when two people wearing such devices come into contact), the unit of higher hierarchy (e.g., a device having a larger power supply, higher charge level, or other measure for determining priority) becomes the master of the backplane (or connected backplanes).

According to embodiments of the present invention, the transmit side 600 of manager modules 100 and charger devices 400 are configured to control complex signal generators of the sensing circuitry 104 to generate complex signals for a number of purposes, including: 1) sensing the surrounding environment to derive impedance measurements and to locate devices on the network; 2) communicating between devices; and 3) providing energy to secondary (sink) devices (whether active or passive), where the complex signal generators of the sensing circuitry 104 are controlled by processing circuitry 106.

The characteristics of the complex signals generated depend on the operational mode. For example, embodiments of the present invention generate precise and accurate signals to sense the environment. On the other hand, signals having low energy consumption and reduced electromagnetic interference (EMI) may be used for communicating between devices. When complex signals are used for energy transfer, the signals can be tuned to reduce or minimize the transfer losses.

Figure 4:
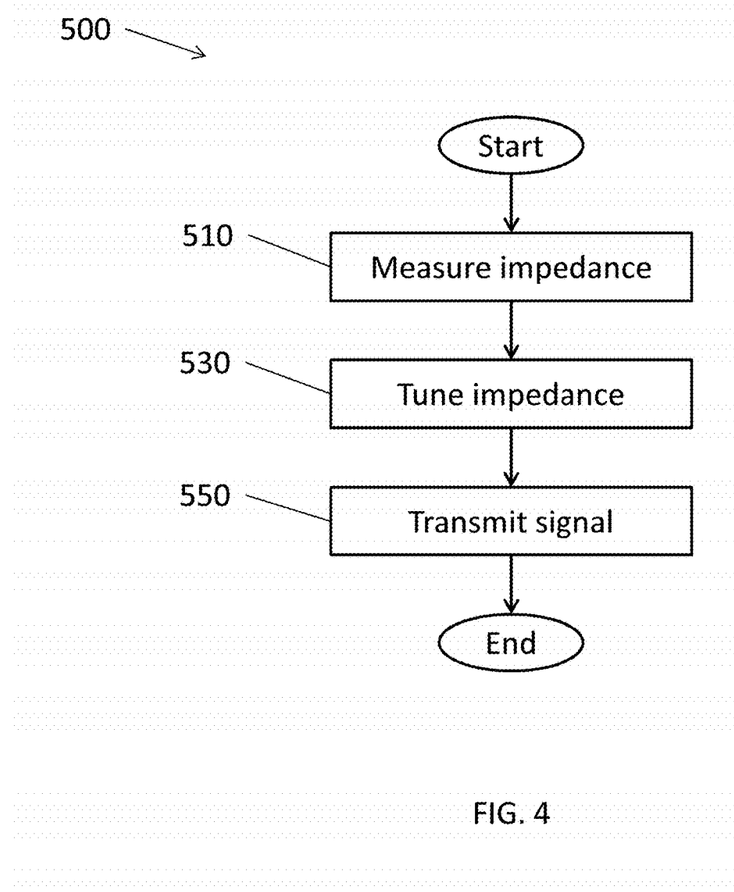
FIG. 4 is a flowchart illustrating a method for transmitting signals or power from a manager device to a sink device according to one embodiment of the present invention.

FIG. 4 is a flowchart illustrating a method 500 for transmitting signals or power from a manager device 100 to a sink device according to one embodiment of the present invention. The method includes performing impedance measurements for the network for detecting activity on or around the bus 510, tuning the impedance on the transmit side 530, and transmitting a signal tuned based on the type of transmission 550 (e.g., data signals or power).

The impedance measurement 510 can be used to determine: device identification, environmental conditions, and transfer efficiencies.

Figure 5A:
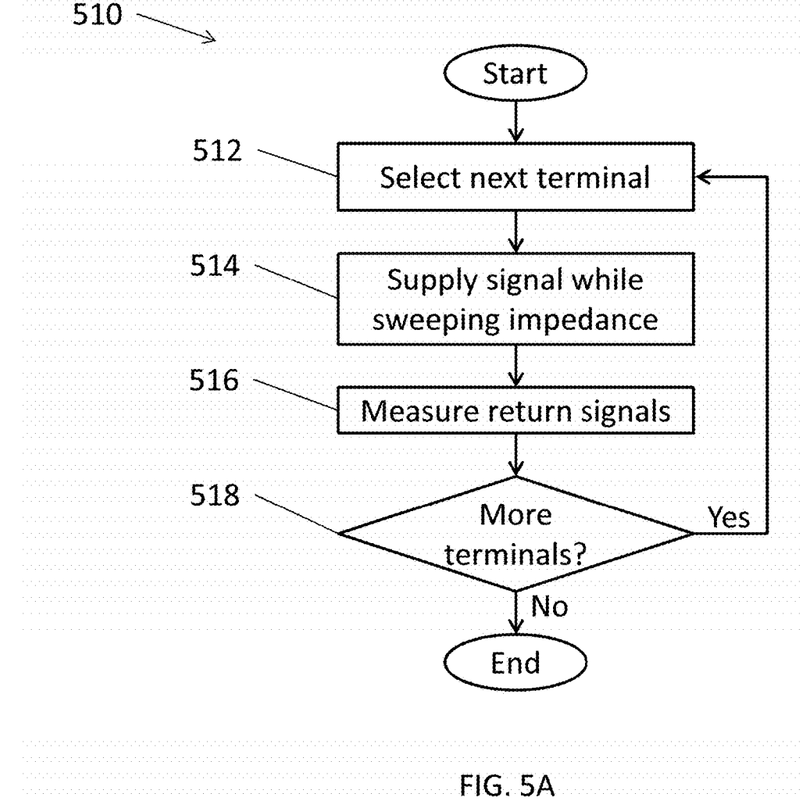
FIG. 5A is a flowchart illustrating a method for performing impedance measurements across a shared conductive backplane according to one embodiment of the present invention.

FIG. 5A is a flowchart illustrating a method for performing impedance measurements across a shared conductive backplane 10 according to one embodiment of the present invention. Referring to FIG. 5A, the impedance measurements can be performed by supplying a complex signal to each of the terminals coupled to the switching matrix of the transmit side 600, where the complex signal sweeps through a range of impedances in operation 514. The return signals are measured in operation 516 and the measurement of return signals can occur concurrently with the sweeping of the impedance 514 (for example, in one embodiment a signal is supplied at a first transmit impedance, return signals corresponding to the first transmit impedance are measured, and the transmit side next "sweeps" and transmits a signal at a second transmit impedance, the return signals of which are, in turn measured).

Return signals that differ from the expected baseline or "open circuit" conditions are recorded in accordance with their associated transmit impedances. For example, without any sink devices 200 coupled to the backplane, the sensing circuitry 104 of a transmitting device 600 would detect reflected signals corresponding to the complex signals transmitted to the backplane 10. However, when active and passive sink devices 200 are coupled to the network, these different sink devices coupled to the network can be identified by their characteristic, identifying impedances. For example, a sink device having a characteristic device impedance of $R_k \pm jQ_k$ can be identified as being connected to the network a transmitting device 600 (e.g., a manager device 100 or a charger 400) supplies a complex signal to the backplane with a transmit impedance of $R_k \pm jQ_k$ because, when the transmitting device 600 supplies the signal at an transmit impedance corresponding to a connected device, the energy supplied at that impedance is consumed by the sink device rather than reflected by the open circuit of the backplane.

Upon detecting devices, the master device 100 sends out a handshake request (e.g., to the other manager device or a sink device 200), listens for handshake requests (e.g., sent by a manager device 100 or a sink device 200), and provides initiation power to passive sink devices. According to one embodiment, collecting impedance measurements and performing handshakes occurs concurrently across all of the combination of available terminals, real and imaginary signals, and real and imaginary impedances.

Figure 5B:
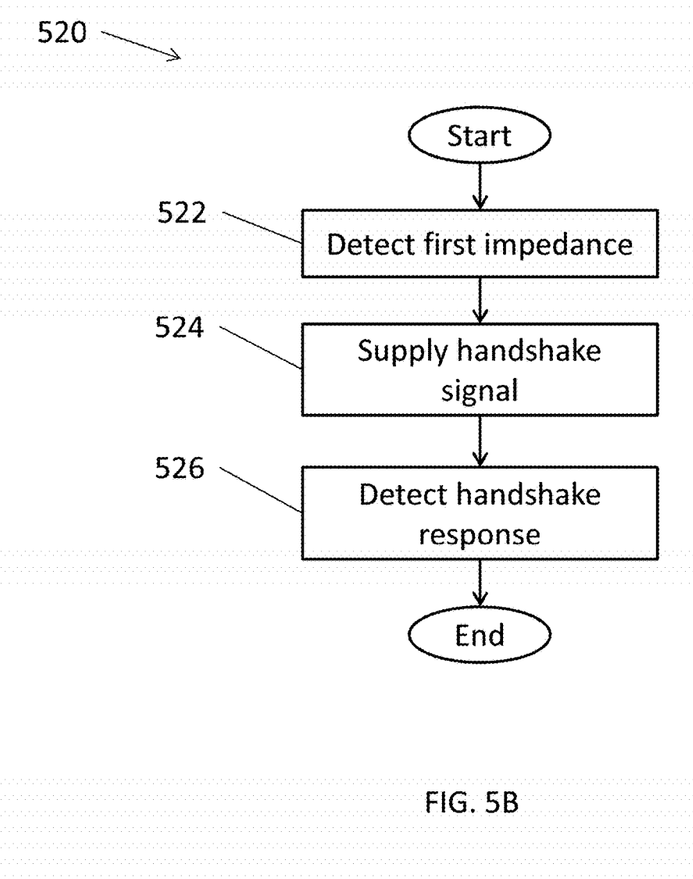
FIG. 5B is a flowchart illustrating a method for performing handshake operations with sink devices according to one embodiment of the present invention.

FIG. 5B is a flowchart illustrating a method 520 for performing handshake operations with sink devices 200 according to one embodiment of the present invention. The method will be described herein with regard to FIG. 3E in which the communication circuitry 216 includes two impedances $R_1 \pm jQ_1$ and $R_2 \pm jQ_2$, wherein only $R_1 \pm jQ_1$ is visible when the switch 2162 is open and wherein $R_1 \pm jQ_1$ and $R_2 \pm jQ_2$ are visible in parallel when the switch 2162 is closed. However, as would be understood to a person of ordinary skill in the art, embodiments of the present invention are not limited to the particular arrangement of impedances shown in FIG. 3E, and other arrangements are possible. For example, in one embodiment, the communication circuitry 216 includes third impedance $R_3 \pm jQ_3$ which can be connected in parallel with $R_1 \pm jQ_1$ and $R_2 \pm jQ_2$ when a second switch is closed. In still other embodiments, the impedances are arranged such that closing one or more switches places the impedances in a series, rather than parallel, arrangement.

Referring to FIG. 5B, in operation 522 a first impedance of a sink device (e.g., $R_1 \pm jQ_1$) is detected based on, for example, the impedance sweeping technique described with respect to FIG. 5A. In operation 524, a first handshake signal is supplied to the conductive medium on which the sink device 200 was detected. The handshake signal may be a digital signal that includes, for example, identification information regarding the manager device, a digital signature (to confirm the identity of the manager device), or other triggering signal, whether analog or digital.

The sink device 200 periodically listens across its terminals for signals/handshake requests from a master device (e.g., a manager device 100). Upon detection, an sink device 200 can switch across specified configured real and imaginary impedances (e.g., by closing switch 2162 as shown in FIG. 3E) to provide its identifier (or device ID), or, may be configured to send out handshake requests (or handshake response) in response. In some embodiments, the sink device 200 only responds when the handshake request received from the manager device 100 corresponds to a manager device that is an authenticated and authorized or otherwise compatible with the sink device 200.

In operation 526, the manager device 100 detects the handshake response. For example, if the sink device 200 responds with a digital or analog handshake request, then the handshake response can be received. In the case of a response that corresponds to a digital signature, the signature can be verified by the manager device 100 to confirm that the sink device is authorized to be powered by the manager device. As another example, if the sink device 200 responds by changing the presented impedance (e.g., by opening or closing switch 2162), then the manager device 100 may detect the handshake response by finding a change in network impedance at an expected impedance (e.g., $R_1 \pm jQ_1$ in parallel with $R_2 = jQ_2$ or $R_1 \pm jQ_1 \| R_2 \pm jQ_2$) during a next impedance sweep.

A passive sink device may be configured to do nothing when it receives a signal from the manager device 100 and the manager device 100 may be configured to recognize the impedance and identifier (or device ID) of the passive sink device in a manner similar to the operation of an RFID device.

After detecting the devices coupled to the backplane 10, the manager device 100 updates its list of connected devices with the impedance measurements and continues in making measurements of the environment and the presence of devices connected to the backplane 10.

Using the list of connected devices and stored measurements, the manager device 100 supplies power to the various devices connected to the system using the connections that the each of the sink devices are detected as being connected to. In some embodiments, the manager device 100 includes a memory storing information regarding the various types of active and passive sink devices 200 that are compatible with the manager device 100. By identifying devices based on their device identifiers or device IDs (e.g., impedance based identifiers or identifiers supplied through digital information signals communicated through the backplane 10), the manager device 100 can look up information regarding the power requirements (e.g., voltage and current ranges, and operating frequency ranges in the case of AC powered devices).

In some embodiments of the present invention, digital data signals may be used for identification and to communicate parameter settings such as operational voltage, bandwidth, etc.

In some instances, multiple sink devices are connected to a same conductive pathway of the backplane 10. In some such cases, the different sink devices may be mutually compatible, e.g., they may operate at overlapping voltage ranges and their combined current requirements are lower than the maximum that can be supplied by the manager device 100. In such cases, the manager device 100 may be configured to supply power to both of these devices.

In other cases, the different sink devices operate at significantly different voltages and therefore would be mutually incompatible. In some embodiments of the present invention, a status indicator may be shown (e.g., on one or more of the sink devices and the manager device) to indicate that the current arrangement is invalid. In other embodiments, the sink devices communicate using the communication circuitry 116 and 216 to negotiate the sharing of the conductive medium. For example, the sink devices utilize time division multiplexing to receive power at compatible voltages during scheduled time intervals. Such sink devices 200 compatible with time division multiplexing sharing techniques may include temporary power storage components such as capacitors or supercapacitors and/or longer term power storage devices such as chemical battery cells. In addition, such sink devices may include switching components to protect circuitry from incompatible (e.g., excessively high) voltages during time periods in which power is being supplied to other sink devices.

In some embodiments of the present invention, after performing the impedance measurement, impedance tuning and matching can be performed by the manager device 100 and the sink devices 200 by modifying the impedance at the impedance matching circuits 102 and 202 in order to find and optimize transfer efficiencies.

In addition, changes in environment would result in small, but measurable, changes in characteristic impedance. According to one embodiment of the present invention, the manager device 100 transmits a complex signal (e.g., a signal that varies in frequency and/or phase) and measures the response across all of its terminals to measure the bus conditions and to modify transmission modes based on conditions. For example, a sink device may only have intermittent contact with a one of the conductive paths of the backplane 10, due, for example, to jostling while the person carrying the device is walking. In other instances, the jostling may cause the sink device to have better contact with a first conductive path, then a second conductive path.

As such, in some embodiments of the present invention, multiple backplanes 10 can be coupled to the device and the controller circuit 106 is configured to perform intelligent switching to perform a determination of the optimal path for charge transfer, whether data or energy (e.g., which backplane to apply the charge to) and the manager device 100 would be configured to supply power or data to the sink device only while an appropriate connection was detected. The impedance measurement may include measurements of bus conditions and comparative efficiency, and can be performed concurrently with other operations.

Precise comparison of supplied and consumed energies (e.g., voltage and current leaving the battery and voltage and current consumed by a sink device) can be made to account for losses and unintended sinks, ensuring operational safety even when the electrically conductive bus is exposed to harsh environments and human connections. For example, sudden decreases in measured impedance can be indicative of a short circuit, thereby indicating that the manager device 100 should stop supplying power to the conductive paths that exhibit short circuit conditions. Furthermore, other unexpected increases in power draw may also indicate the presence of unintended sinks, which would also motivate disabling the supply of power. In embodiments of the present invention, the manager device 100 continues monitoring impedance on the network to detect when it may be safe to begin supplying power again.

As used herein, the term "controller circuit" is used to refer to any controller circuit capable of performing the functions described herein. Examples of systems and devices that can serve as a "controller circuit" include, but are not limited to, a general purpose central processing unit (CPU) coupled to memory storing instructions to be executed on the CPU (e.g., a microcontroller, an processor based on, for example, an x86 or ARM® architecture, coupled to dynamic memory, etc.), a microcontroller, an appropriately programmed field programmable gate array (FPGA), and an application specific integrated circuit (ASIC). In addition, in some embodiments, the controller circuit may be an analog feedback circuit or system, implemented in an ASIC or otherwise.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An apparatus for supplying power to a plurality of devices comprising:
a conductive backplane comprising a conductive metal or conductive textile, wherein each of said plurality of devices are coupled to the conductive backplane via a respective conductive pathway;
sensing circuitry comprising a signal generator and a signal detector, the sensing circuitry coupled to the conductive backplane;
a power supply coupled to the conductive backplane; and
a controller circuit including a memory configured to:
store information about power requirements of each of the plurality of devices in the memory;

control the signal generator to supply a plurality of sensing signals at a plurality of transmit impedance values to the conductive backplane;

analyze a plurality of return signals detected by the signal detector, the return signals corresponding to the sensing signals;

detect, based on the analyzed return signals, the presence of a sink device and its conductive pathway and identify said detected sink device, coupled to the conductive backplane;

retrieve the stored power requirements for the detected and identified sink device; and control the power supply to supply power according to the retrieved power requirements to the detected and identified sink device via its conductive pathway.

2. The apparatus of claim 1, wherein the controller circuit is further configured to:

detect the absence of the sink device; and control the power supply to stop the supply of power to the sink device via the conductive pathway in response to detecting the absence of the sink device.

3. The apparatus of claim 2, wherein the controller circuit is configured to detect the absence of the sink device by detecting a change in a return signal of the return signals corresponding to the sink device.

4. The apparatus of claim 2, wherein the controller circuit is configured to detect the absence of the sink device by detecting a decrease in current on the conductive pathway.

5. The apparatus of claim 1, wherein the controller circuit is configured to:

detect a short circuit on the conductive pathway; and control the power supply to stop supplying power to the conductive pathway in response to detecting the short circuit.

6. The apparatus of claim 1, wherein the controller circuit is further configured to:

supply a handshake request to the sink device via the conductive pathway; and receive a handshake response from the sink device via the conductive pathway.

7. The apparatus of claim 6, wherein the handshake request comprises a digital signal, the digital signal representing a code.

8. The apparatus of claim 6, wherein the handshake response comprises a change in impedance, and wherein the apparatus is configured to receive the handshake response by detecting a change in a return signal of the return signals after supplying the handshake request.

9. The apparatus of claim 1, wherein the conductive pathway comprises a conductive fabric of an article of clothing.

10. The apparatus of claim 1, wherein the controller circuit is a central processing unit (CPU), a microcontroller, a field programmable gate array (FPGA), an application specific integrated circuit (ASIC), or an analog feedback circuit.

11. The apparatus of claim 1, wherein the apparatus is located on a vehicle comprising a seat, wherein the conductive pathway comprises a first electrically conductive portion of a surface of the seat, wherein the apparatus is configured to change the battery while the battery is electrically connected to a second electrically conductive portion of an article of clothing, and wherein the first electrically conductive portion of the surface of the seat is electrically connected to the second electrically conductive portion of the article of clothing.

12. The apparatus of claim 1, wherein the controller circuit identifies said detected sink device based on the analyzed return signals and position of said detected sink device with respect to the conductive backplane.

13. A method for supplying power to a plurality of devices coupled to a conductive backplane, the method comprising:

storing information about power requirements of each of the plurality of devices, in a memory;

supplying a plurality of sensing signals at a plurality of transmit impedance values to the conductive backplane;

analyzing a plurality of return signals received from the conductive backplane, the return signals corresponding to the sensing signals;

detecting the presence of a sink device coupled to the conductive backplane based on the analyzed return signals;

identifying said detected sink device;

retrieving the stored power requirements for the identified sink device; and supplying power according to the retrieved power requirements from a power supply to the identified sink device via the conductive backplane.

14. The method of claim 13, further comprising:

detecting the absence of the sink device; and stopping the supplying power to the sink device via the conductive backplane in response to detecting the absence of the sink device.

15. The method of claim 14, wherein the detecting the absence of the sink device comprises detecting a change in a return signal of the return signals corresponding to the sink device.

16. The method of claim 14, wherein the detecting the absence of the sink device comprises detecting a decrease in current on the conductive pathway.

17. The method of claim 13, further comprising:

detecting a short circuit; and stopping the supplying power to the sink device via the conductive backplane in response to detecting the short circuit.

18. The method of claim 13, further comprising:

supplying a handshake request to the sink device via the conductive pathway; and receiving a handshake response from the sink device via the conductive pathway.

19. The method of claim 13, wherein identifying said detected sink device is based on the analyzed return signals and position of said detected sink device with respect to the conductive backplane.

* * * * *